United States Patent
Paul et al.

(10) Patent No.: US 9,123,246 B2
(45) Date of Patent: Sep. 1, 2015

(54) PARKING GUIDANCE SYSTEM AND METHOD BASED ON VEHICLE HUMAN OCCUPANCY

(71) Applicant: Xerox Corporation, Norwalk, CT (US)

(72) Inventors: Peter Paul, Penfield, NY (US); Robert De Beukelaer, Leidschendam-Voorburg (NL); Steve Beer, Leicestershire (GB); Martin Edward Hoover, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 22 days.

(21) Appl. No.: 14/083,905

(22) Filed: Nov. 19, 2013

(65) Prior Publication Data

US 2014/0139359 A1 May 22, 2014

Related U.S. Application Data

(60) Provisional application No. 61/727,884, filed on Nov. 19, 2012.

(51) Int. Cl.
*G06F 19/00* (2011.01)
*G08G 1/14* (2006.01)
*G01C 21/34* (2006.01)
*G06Q 30/02* (2012.01)
*G01C 21/36* (2006.01)

(52) U.S. Cl.
CPC ........... *G08G 1/141* (2013.01); *G01C 21/34* (2013.01); *G06Q 30/0284* (2013.01); *G08G 1/146* (2013.01); *G08G 1/148* (2013.01); *G01C 21/3685* (2013.01); *G08G 1/144* (2013.01)

(58) Field of Classification Search
CPC ..... G08G 1/141; G06Q 30/0284; G01C 21/34
USPC .................. 340/932.2; 701/400; 705/13, 13.1
See application file for complete search history.

(56) References Cited

U.S. PATENT DOCUMENTS

| | | | |
|---|---|---|---|
| 2006/0250278 A1* | 11/2006 | Tillotson et al. | 340/932.2 |
| 2008/0195428 A1* | 8/2008 | O'Sullivan | 705/6 |
| 2009/0309974 A1* | 12/2009 | Agrawal et al. | 348/159 |
| 2014/0278840 A1* | 9/2014 | Scofield et al. | 705/13 |

* cited by examiner

*Primary Examiner* — Brent Swarthout
(74) *Attorney, Agent, or Firm* — Fay Sharpe LLP

(57) ABSTRACT

A system and methods that account for vehicle human occupancy in parking management systems. Human throughput to an event is optimized by utilizing a smart parking guidance system based on the human occupancy of the vehicles to be parked.

16 Claims, 2 Drawing Sheets

PARKING GUIDANCE SYSTEM AND METHOD BASED ON VEHICLE HUMAN OCCUPANCY

CROSS REFERENCE TO RELATED PATENTS AND APPLICATIONS

This application claims priority to and the benefit of the filing date of U.S. Provisional Patent Application Ser. No. 61/727,884, filed Nov. 19, 2012, which application is hereby incorporated by reference.

BACKGROUND

Reducing time wasted when traveling to a destination is one of the main goals of Intelligent Transportation Systems. Many studies have been performed that attempt to quantify time wasted in traffic congestion. These studies show that the time wasted and the equivalent lost productivity, lost business, and lost tax revenue is significant. Further, traffic congestion leads to wasted fuel and increased emission of greenhouse gases. Traffic planners and transportation agencies seek methods that reduce traffic congestion. One concept that is used in highway traffic management is to incent people to "car pool", or "ride share" so that the number of people per vehicle on average is increased. Thus, this enables increased human throughput through the highway system, while maintaining the same vehicle throughput through the system and the same vehicle capacity of the roadway system. Human throughput is increased without building out new roadway capacity. The incentive can be in the form of a special travel lane that only multi-occupant vehicles can use—this is often in the form of a special limited access "express lane" where, because only certain vehicles can use it, it tends to have much better traffic flow. Other incentives are monetary in the form of a reduced tolling fee for multi-occupant vehicles.

BRIEF DESCRIPTION

The present disclosure sets forth systems and methods that take into consideration vehicle human occupancy in parking management systems. The systems and methods described herein maximize human throughput to an event (or location) by utilizing a smart parking guidance system based on the human occupancy of the vehicles to be parked.

In accordance with one aspect, a method comprises determining the number of people in a vehicle and routing the vehicle to a specific location based at least in part on the number of people determined to be in the vehicle. The determining the number of people in the vehicle can include at least one of receiving an input value corresponding to the total number of people in the vehicle, automatically determining the number of people in the vehicle based on a number of unique identifiers within the vehicle, or automatically detecting occupants within the vehicle with sensors. The method can include verifying the number of people in the vehicle and/or assessing a fee to an account associated with the vehicle based at least in part on the number of people determined to be in the vehicle. The method can also include comparing the number of people determined to be in the vehicle to the number of people verified to be in the vehicle and adjusting the fee if the difference is greater than zero.

The determining can include using at least one of an electronic device of the vehicle or a personal mobile communication device. The routing the vehicle to a location can include routing the vehicle to an unoccupied parking space. The routing the vehicle to a location can include routing the vehicle to a parking location, said routing based at least in part on attributes of the parking location. The attributes of the parking location can include at least one of location, distance from a venue, size, ease of entry, ease of departure, etc.

In accordance with another aspect, a system comprises a guidance engine and at least one occupancy determiner associated with a vehicle, the determiner in communication with the guidance engine. The guidance engine is configured to receive data from the occupancy determiner relating to the number of people in the vehicle, and generate route guidance for directing the vehicle to a specific location based at least in part on the number of people in the vehicle. The system can further include an occupancy verifier for verifying the number of people in the vehicle. The occupancy verifier can include a vehicle scanner configured to detect occupants of the vehicle. The system can also include a financial transaction processing unit in communication with the guidance engine, wherein the guidance system is configured to assess a fee to an account associated with the vehicle.

In accordance with another aspect, a method comprises receiving occupancy information from a plurality of vehicles, matching each vehicle with a parking space based at least in part on the occupancy information associated with each vehicle, transmitting information regarding the matched parking spaces to the vehicles, and verifying the occupancy information of each vehicle. The receiving, matching, transmitting and verifying can be performed by one or more electronic devices.

DETAILED DESCRIPTION

The systems and methods described herein maximize human throughput to an event by utilizing a smart parking guidance system based on the human occupancy of the vehicles to be parked. For example, consider an event held at a venue such as a stadium which has several parking lots associated with the venue where each parking lot is at various distances away from the venue. The patrons to the event are arriving by passenger car from various source locations at various times. The parking guidance system determines which destination parking lot each vehicle should park at based on current traffic conditions and parking lot space availability. Once the destination parking lot is determined for a vehicle, a satellite navigation system can guide the vehicle in getting to the destination parking lot using familiar "turn-by-turn" navigation. The destination parking lot and the route travelled may dynamically be adjusted based on real-time traffic conditions and real-time parking lot space availability. In accordance with the present disclosure, the step of determining which parking lot each vehicle is guided to can also be based on the number of human occupants in the vehicle.

Figure 1:
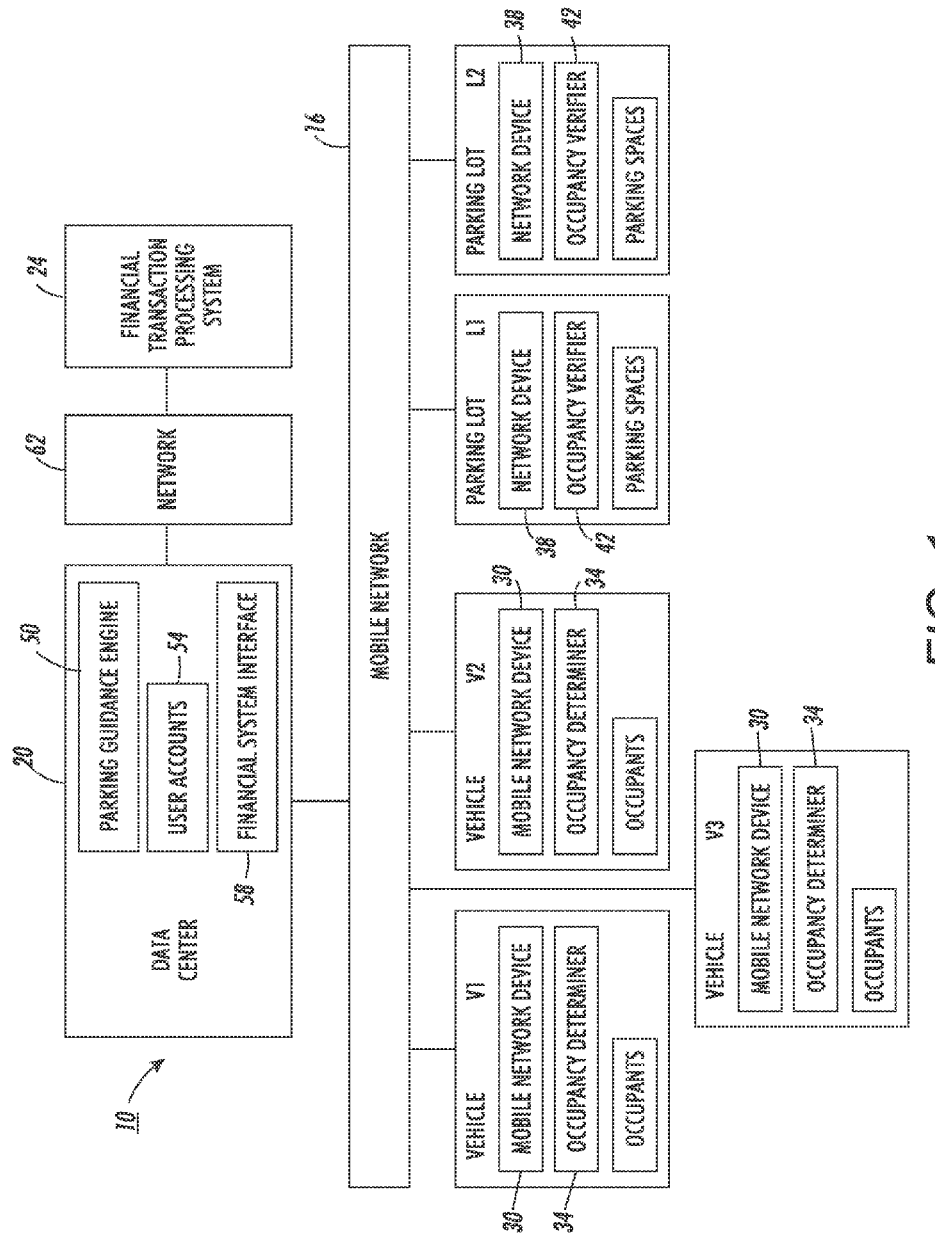
FIG. 1 is block diagram of an exemplary system in accordance with the disclosure.

FIG. 1 depicts one exemplary embodiment of a parking guidance system 10 in accordance with the present disclosure. The system 10 is comprised of vehicles V1, V2, and V3, parking lots L1 and L2, a mobile network 16, a data center 20, and a financial transaction processing system 24. The vehicles V1, V2 and V3 each contain a mobile networking device 30 to communicate to the mobile network 16, the parking lots L1 and L2, and the back end data center 20 through known protocols and communications systems. The mobile networking devices 30 may also have a user interface and be attached to a satellite navigation system. The satellite navigation system receives data from orbiting satellites to determine the real time position of the vehicle. The direction of travel and position along a mapped roadway system is also determined by the navigation system. The satellite navigation system may also receive real time traffic information through the mobile network or through another communication method such as through an FM radio broadcast.

Each vehicle V1, V2 and V3 also contains an occupancy determiner unit 34. The occupancy determiner unit 34 may be a sensor which determines the human occupancy in the vehicle such as a camera or ultrasonic sensor. In one embodiment, the occupancy determiner unit may interface to the vehicle's sensors to determine the human occupancy using human occupancy sensors within the vehicle used to indicate seat belt warnings and to determine air bag pressure levels. In some embodiments of this invention the occupancy determiner unit may not be used and the user interface is used by the driver or other occupant to indicate the human occupancy of the vehicle by typing in the appropriate number of people or selecting a graphical user interface widget to indicate the number of human occupants. Each occupant may have a unique code which they key into the user interface. In another embodiment each occupant may type in an event ticket number or other unique code for the ticket to the event. The event ticket may also be scanned by a barcode scanner or a camera attached to the occupancy determiner unit or the mobile device in order to count the number of people in the vehicle by counting the number of valid tickets entered into the system. In another embodiment, the mobile device within the vehicle may facilitate the purchase of tickets to the event, and thus automatically entering the ticket number of the purchased ticket as belonging to a vehicle occupant. The mobile network device user interface can also be used to display parking pricing for various parking lots and can be used to reserve a parking space within a parking lot. The pre-payment for the parking lot and the reservation of the parking lot space is handled through communications with the back end data center through the mobile network.

The parking lots L1 and L2 contain, or are otherwise outfitted with, a network interface device 38 for communicating to the mobile devices 30 and the back end data center 20 through the mobile network 16. The parking lots L1 and L2 also include a vehicle occupancy verifier unit 42 which may be a camera and illuminator based system using automatic human detection and counting, or using remote human detection and counting using telepresence where vehicle imagery is sent to a remote station where parking lot attendants review the imagery to verify the human count as declared by the vehicle prior to the assignment of the vehicle to the parking lot.

In addition or in the alternative, mobile attendants can use devices which query the mobile network device or other interface into the vehicle, such as dedicated short range communications (DSRC), WiFi, or Bluetooth to determine the human occupancy count as declared by the vehicle's driver before being guided to the parking lot and compare this value to the human occupancy count visually observed. If the declared count does not match the actual count (e.g., the actual count may typically be lower than the declared count), then a penalty is assessed through accessing the patron's account on the data center through the parking lot's network device communicating through the mobile network.

Note that the parking lot's network device can communicate with the vehicle's mobile network device through the mobile network, or other communication means, to access the patron's account identifier. The parking lot attendant can also access the patron's account identifier by communicating with the vehicle's mobile device through the use of a handheld device or the like. In another embodiment, a camera and automatic license plate recognition technology can also be used by the parking lot to access the patron's account identifier in order to assess any additional penalty or fee if the actual human occupancy count differs from the occupancy count declared when reserving space within the parking lot. In yet another embodiment, the vehicle may be turned away from a parking lot (or previously assigned space within a lot) and re-routed to another parking lot (or different space within the same lot or a different lot) if the actual human occupancy of the vehicle differs from the declared human occupancy of the vehicle when the parking reservation was determined.

The data center 20 contains the parking guidance engine 50 that, for example, determines the assignments for the vehicles to parking lots, determines pricing of parking lots, presents the pricing to the vehicle's driver through the vehicle's mobile network device user interface through the mobile network, etc. The data center 20 also contains the user account management system 54 including the account balance, recent transactions, and a web and email interface into the user accounts. The data center 20 also contains an interface 58 for connecting via network 62 to the financial transaction processing system 24 which interfaces to banks and credit card processing in order to make payments and credits to the account.

The system described above includes a parking management system that has "Occupancy Determiner" units on the vehicles, "Occupancy Verifier" units in the parking lots, and a "Parking Guidance Engine" which executes a parking guidance and fee generation algorithm based at least in part on vehicle human occupancy data from the "Occupancy Determiner" units and the "Occupancy Verifier" units. It will be appreciated that certain aspects of this disclosure can be implemented via existing devices within vehicles such as GPS/Navigation units as well as personal cell phones (e.g., smartphones) or other similar devices.

Figure 2:
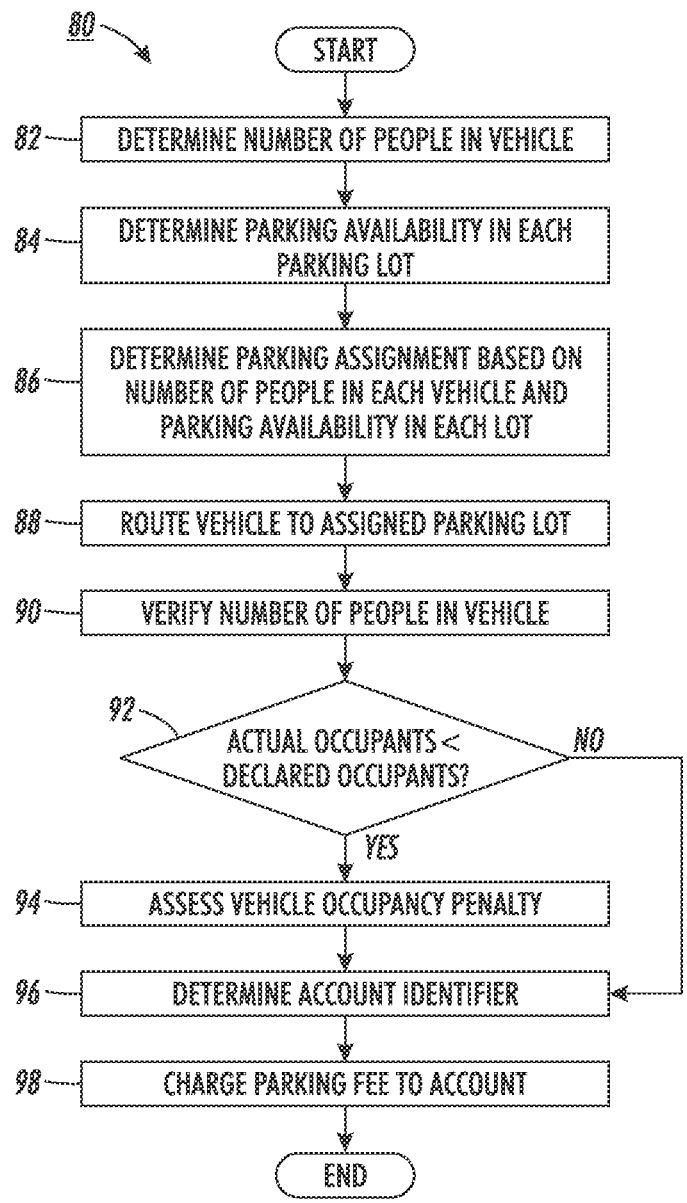
FIG. 2 is a flow chart illustrating an exemplary method in accordance with the disclosure.

One exemplary embodiment of the parking guidance and fee generation method 80 (algorithm) is depicted in FIG. 2. The algorithm is described with respect to one vehicle. The algorithm is performed for each vehicle that has indicated its destination to be the event venue.

The method begins with process step 82 where the number of people in the vehicle is determined. As noted above, this can be performed through an indication to the driver or other vehicle occupant to input the number of occupants in the vehicle through a user interface to an on board unit that has a mobile network interface. Thus, a simple approach is for the driver to indicate how many people are in the vehicle. In other embodiments, the number of people in the vehicle is determined using sensors within the vehicle such as seat belt warning sensors or air bag sensors, or the number of people is determined by scanning event tickets that vehicle occupants possess or interfacing with electronic tickets that the occupants can access. In another embodiment, the occupants may be asked to type in a unique code such as a code that was given out during the purchase of the ticket to the event. Other methods of determining vehicle occupancy are also possible.

In process step 84, the system queries each parking lot to determine the current space availability taking into account those vehicles which may be assigned to the parking lot that are on route to each parking lot.

In process step 86, vehicles are assigned to parking spaces based on the number of people in each vehicle and the availability of parking spaces. In one exemplary embodiment, this can be done in five steps 86(a)-86(f) as follows:

Step 86(a): First, the number of vehicles of different occupancy levels expected for the event is determined. The number of vehicles with various occupancy levels can be estimated using historical data as to the distribution of vehicle human occupancy levels for traffic travelling to events. For example, a table may be used to depict the historical vehicle human occupancy as follows:

| Configuration | Human Occupancy | Percentage |
|---|---|---|
| Driver Only | 1 | 10% |
| Driver & 1 Passenger | 2 | 20% |
| Driver & 2 Passengers | 3 | 20% |
| Driver & 3 Passengers | 4 | 20% |
| Driver & 4 Passengers | 5 | 10% |
| Driver & 5 Passengers | 6 | 10% |
| Driver & 6 Passengers | 7 | 5% |
| Driver & 7 or more Passengers | 8+ | 5% |

After each event this table may be updated using the actual measured vehicle human occupancy for the traffic to the event.

Step 86(b): Equations 1 through 3 are then used to determine the expected number of vehicles with different occupancy levels.

$$\mu_O = \sum_i i \times p_i = 1 \times p_1 + 2 \times p_2 + 3 \times p_3 + \ldots + 8 \times p_8 \quad (1)$$

$$T_V = \frac{T_A}{\mu_O} \quad (2)$$

$$N_i = p_i \cdot T_V \quad (3)$$

Where i represents the various vehicle occupancy levels (1 through 8 in the example in the table, above), $p_i$ is the percentage of vehicles at the i occupancy level (the third column in the example in the table, above), $\mu_o$ is the average vehicle human occupancy based on the historical distribution data for traffic to an event, $T_v$ is the total number of vehicles expected, $T_A$ is the total human attendance of the event, and $N_i$ is the number of vehicles expected at occupancy level i.

Step 86(c): Rank the available parking spaces based on a desirability metric such as closeness to the actual event venue.

Step 86(d) Reserve the best (based on the desirability metric) $N_{imax}$ parking spaces for vehicles with imax occupants, the next $N_{imax-1}$ spaces for vehicles with imax-1 occupants, etc. . . . where imax is the maximum number of vehicle human occupants to be considered in the parking space allocation system. In the example in the table above, the system would reserve the first $N_8$ most desirable spaces for vehicles with 8 occupants, the next $N_7$ most desirable spaces for vehicles with 7 occupants, etc. . . . .

Step 86(f) Assign a vehicle to the most desirable parking space that is available that has been reserved for the number of occupants in that vehicle.

Note that in a simple modification of this process, the value $T_A$, the total human attendance of the event, can be replaced dynamically as vehicles are being assigned parking spaces in real time by $T_R=T_A-T_P$, where $T_P$ is the total people in vehicles that have been already assigned a parking space and $T_R$ is the total people still remaining in vehicles to be parked.

Note also, that the value of $T_R$ can also take into account people to arrive at the event venue through means other than through vehicles that are to be parked, for example, by public transportation or by walking to the event. This takes in to account the actual vehicle human occupancy distribution being different from the expected distribution.

Thus by using this procedure a vehicle with two occupants, for example, may be assigned to a parking space in a location further away from the venue while spaces remain open closer to the venue that are reserved for 3, 4, 5, 6, 7, and 8 occupant vehicles that are expected to arrive later.

In another embodiment, the time to the start of the event is also taken into account in the vehicle parking assignment. One simple way is to use the procedure outlined above to assign the parking spaces for up to 30 minutes before the event start, then to assign the best available parking spot to vehicles that are routed 30 minutes or less from the event start. This way desirable parking spaces close to the venue are not wasted due to the expected distribution not matching the actual distribution.

In another embodiment, the assignment is performed by offering the parking spaces to the vehicle drivers at different prices, where more desirable parking spaces are offered at higher prices subject reducing the prices based on higher vehicle human occupancy.

Returning to FIG. 2, in process step 88 the vehicles are routed to their parking lots and spaces using standard satellite navigation systems and/or cellular data networks. In process step 90, once the vehicle arrives at the assigned parking lot, the vehicle human occupancy is verified. This verification can be in the form of an automated vehicle human occupancy detection system based on cameras and automated human detection image processing technology. In another embodiment, a human attendant visually verifies the human occupancy of the vehicle.

In process step 92 the vehicle human occupancy declared at the time of assignment of the vehicle to the parking space is recalled by identifying the vehicle and querying the declared occupancy in a data record. The identification can be performed by querying a mobile communications device within the vehicle. In another embodiment the identification can be performed by performing automatic license plate recognition and using the license plate as a vehicle identifier. Once the vehicle identifier is known, then the declared occupancy can be recalled. The vehicle human occupancy declared at the time of parking space assignment is compared to the actual vehicle human occupancy determined in step 82.

If the actual vehicle human occupancy is less than the vehicle human occupancy declared at the time the parking space was assigned, then a penalty can be assessed in process step 94. The penalty may be an increased fee for parking or it may be a reassignment of the vehicle to a different parking space. Otherwise, in process step 96 and 98 the account identifier is determined and the parking fee (including any penalty) is charged to the account.

It will be appreciated that variations on the basic algorithm described above are possible. For example, in one embodiment the size of a given vehicle as it takes up space in the parking lot and/or on the roadway can be used in the parking space assignment algorithm. Vehicle information can be provided by the driver and specification information can be referenced from a database on the internet, for example. In another embodiment, the algorithm may use the metric of humans per sq ft in the vehicle instead of vehicle human occupancy. The vehicle human density is simply the vehicle human occupancy number divided by the "footprint" of the vehicle in terms of its square footage. In other embodiments, the desirability of the parking lot spaces may be customized to each vehicle based on, for example, i) people going to different events that share the same parking lots so they can share the same vehicle going to that parking lot, ii) by using distance to actual venue entrances and event seat in determining the parking space desirability, iii) parking space availability is affected by people attending different events at different times sharing the same parking lots coming and going.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method comprising:
   determining the number of people in a vehicle using an occupancy determiner device associated with the vehicle; and
   routing the vehicle, using a parking guidance engine, to a specific location based at least in part on the number of people determined to be in the vehicle;
   wherein the determining the number of people in the vehicle includes at least one of receiving an input value corresponding to a declared number of people in the vehicle, automatically determining the number of people in the vehicle based on a number of unique identifiers within the vehicle, or automatically detecting occupants within the vehicle with sensors;
   wherein the routing the vehicle to a specific location includes routing the vehicle to a parking location, and wherein said routing is based at least in part on attributes of the parking location; and
   wherein the routing the vehicle to a parking location includes accessing a parking space desirability index determined using at least in part a location of at least one event seat of a vehicle occupant as per a seat location indicated on a ticket.

2. The method of claim 1, further comprising verifying the number of people in the vehicle.

3. The method of claim 2, further comprising assessing a fee to an account associated with the vehicle based at least in part on the number of people determined to be in the vehicle.

4. The method of claim 3, further comprising comparing the number of people determined to be in the vehicle to the number of people verified to be in the vehicle and adjusting the fee if the difference is greater than zero.

5. The method of claim 1, wherein the determining includes using at least one of an electronic device of the vehicle or a personal mobile communication device.

6. The method of claim 1, wherein routing includes routing the vehicle to an unoccupied parking space.

7. The method of claim 1, wherein the attributes of the parking location include at least one of location, distance from a venue, size, ease of entry, or ease of departure.

8. The method of claim 1, wherein the determining the number of people in a vehicle is performed on a plurality of vehicles in real-time, and the routing the vehicle to a specific location based at least in part on the number of people determined to be in the vehicle further includes routing the vehicle to a specific location based at least in part on information about other vehicles of the plurality of vehicles.

9. The method of claim 8, wherein the information about other vehicles includes at least one of a number of vehicle occupants or size of a vehicle.

10. A system comprising:
    a guidance engine; and
    at least one occupancy determiner associated with a vehicle, the determiner in communication with the guidance engine;
    wherein the guidance engine is configured to receive data from the occupancy determiner relating to the number of people in the vehicle, and generate route guidance for directing the vehicle to a specific location based at least in part on the number of people in the vehicle; and
    wherein the route guidance is generated using a parking space desirability index determined using at least in part a location of at least one seat of a vehicle occupant as per the seat location indicated on a ticket.

11. The system of claim 10, further comprising a financial transaction processing unit in communication with the guidance engine, wherein the guidance system is configured to assess a fee to an account associated with the vehicle.

12. The system of claim 11, further comprising an occupancy verifier for verifying the number of people in the vehicle.

13. The system of claim 12 wherein the occupancy verifier includes a vehicle scanner configured to detect occupants of the vehicle.

14. The system of claim 13, wherein the financial transaction processing unit is further configured to compare a number of people determined to be in the vehicle by the occupancy determiner to the number of people verified to be in the vehicle by the occupancy verifier, and adjust the fee if the difference is greater than zero.

15. A method comprising:
    receiving occupancy information from a plurality of vehicles;
    matching each vehicle with a parking space based at least in part on the occupancy information associated with each vehicle;
    transmitting information regarding the matched parking spaces to the vehicles; and
    verifying the occupancy information of each vehicle;
    wherein the matching each vehicle with a parking space includes accessing a parking space desirability index determined using at least in part a location of at least one seat of a vehicle occupant as per the seat location indicated on a ticket.

16. The method of claim 15, or any other claim, wherein the receiving, matching, transmitting and verifying are performed by one or more electronic devices.

* * * * *